United States Patent [19]

Clawson

[11] Patent Number: 5,257,242

[45] Date of Patent: Oct. 26, 1993

[54] METHOD OF GEOPHYSICAL EXPLORATION

[75] Inventor: Steven R. Clawson, Lakewood, Colo.

[73] Assignee: Amoco Corporation, Chicago, Ill.

[21] Appl. No.: 735,142

[22] Filed: Jul. 24, 1991

[51] Int. Cl.$^5$ .............................................. G01V 1/28
[52] U.S. Cl. ......................................... 367/38; 367/73
[58] Field of Search .................... 364/421; 367/38, 47, 367/59, 60, 73

[56] References Cited

U.S. PATENT DOCUMENTS

| | | | |
|---|---|---|---|
| 4,507,613 | 3/1985 | Dion | 324/340 |
| 4,646,239 | 2/1987 | Bodine et al. | 364/421 |
| 4,755,972 | 7/1988 | Hanson et al. | 367/75 |
| 4,779,237 | 10/1988 | Bodine | 367/47 |
| 4,926,394 | 5/1990 | Doyen | 367/73 |
| 4,967,401 | 10/1990 | Barney | 367/46 |

Primary Examiner—Ian J. Lobo
Attorney, Agent, or Firm—Timothy D. Stanley

[57] ABSTRACT

A method of geophysical exploration is described for transforming qualitative descriptors of seismic data into a quantifiable decision-making tool to estimate the formation properties as well as economic potential of a selected formation in the earth's subsurface. Qualitative descriptors of the waveform of seismic events contained in a first set of seismic signals are obtained and correlated with formation properties to obtain a series of one or more histograms. Qualitative descriptors of seismic events contained in a second set of seismic data can be obtained and transformed into estimates of formation properties as well as estimates of the economic potential of a selected formation for producing hydrocarbons employing such histograms.

12 Claims, 5 Drawing Sheets

METHOD OF GEOPHYSICAL EXPLORATION

BACKGROUND OF THE INVENTION

The present invention relates generally to a method of geophysical exploration and more particularly to a method for transforming qualitative descriptors of seismic data into a quantifiable decision-making tool to obtain estimates of formation properties as well as to estimate the economic potential of selected formations for producing hydrocarbons.

Geophysical exploration of the earth's subsurface formations is most typically undertaken by recording seismic signals representative of the transmission and reflection properties of subsurface formations to seismic energy imparted into the earth. Initially, interpretation of displays of seismic signals was qualitative in nature and was generally limited to developing structural images of the earth's subsurface formations. Explorationists soon recognized that such seismic signals also contained quantifiable attributes (for example, frequency, amplitude, phase, etc.) which have been employed to evaluate subsurface formation structures as well as provide indications of changes in formation lithology and pore fluid content. Exemplary of such focus are Bodine et al. in U.S. Pat. No. 4,646,239, Hanson et al. in U.S. Pat. No. 4,755,972, Bodine in U.S. Pat. No. 4,779,237, and Barney in U.S. Pat. No. 4,967,401. In fact, only Bodine directly addressed explorationists' real interest of transforming the quantitative attributes of the seismic data into quantitative estimates of the earth's formation properties. In spite of such advances, the explorationist is still generally left with making qualitative assessments of the earth's formations from visual displays of seismic data.

Unlike most recent advances in geophysical exploration which attempt to obtain quantitative attributes of seismic signals to evaluate and distinguish subsurface formations, the present invention provides a novel technique for transforming qualitative descriptors of the seismic signals into estimated formation properties as well as a method to evaluate the economic potential of a formation for producing hydrocarbons.

SUMMARY

The present invention relates generally to a method of geophysical exploration and more particularly to a method for transforming qualitative descriptors of seismic data into a quantifiable decision-making tool to estimate formation properties as well as the economic potential of selected formations for producing hydrocarbons. More specifically, qualitative descriptors of seismic events in a first set of seismic data are obtained. Such qualitative descriptors characterize relative features of the waveform of the seismic events. The qualitative descriptors can then be correlated with one or more given formation properties to form histograms. Qualitative descriptors of seismic events in a second set of seismic data can then be obtained and transformed into estimates of the given formation properties as well as provide estimates of the economic potential of associated formations for producing hydrocarbons with the use of the histograms. A set of formation properties are obtained from various geographic locations within a basin, and a set of synthetic seismic signals are derived therefrom. Qualitative descriptors of the waveform of seismic events contained in the synthetic seismic signals are then obtained and correlated with the formation properties to obtain a series of one or more histograms. Qualitative descriptors can then be obtained for the waveform of seismic events in real seismic data. The qualitative descriptors of the real seismic data can be transformed into estimates of formation properties as well as estimates of the economic potential of a selected formation for producing hydrocarbons employing such histograms. These and other benefits of the present will be more fully understood with the benefit of the attached drawings and the more complete discussion below.

BRIEF DESCRIPTION OF THE DRAWINGS

FIG. 4a comprises a model of a selected layer within the earth's subsurface formation;

FIG. 4b comprises a set of synthetic seismic signals generated from the model in FIG. 4a.

DETAILED DESCRIPTION OF THE INVENTION

In order to better understand the present invention, the following introductory comments are provided.

Geophysical exploration of the earth's subsurface formations is most typically undertaken by recording seismic signals representative of the transmission and reflection properties of subsurface formations to seismic energy imparted into the earth. Initially, interpretation of displays of seismic signals was qualitative in nature and was generally limited to developing structural images of the earth's subsurface formations. Explorationists soon recognized that such seismic signals also contained quantifiable attributes (for example, frequency, amplitude, phase, etc.) which have been employed to evaluate subsurface formation structures as well as provide indications of changes in formation lithology and pore fluid content. Only recently have explorationists' attention focused on the need to transform such quantitative attributes into estimates of formation properties as well as to evaluate the economic potential of selected formations.

In spite of such developments, no method exists for transforming qualitative information contained within a set of seismic data into quantifiable estimates of formation properties or estimates of the economic potential of a formation for producing hydrocarbons. In fact, explorationists continue to employ qualitative descriptors of seismic data to evaluate subsurface formations because such qualitative descriptors are readily discernible to the explorationists and within a given basin they can be indicative of changes in formation properties important to the explorationists. The present invention provides a method for transforming such qualitative descriptors into a quantifiable decision making tool to estimate either formation properties or the economic potential of a selected formation for producing hydrocarbons.

Figure 1:
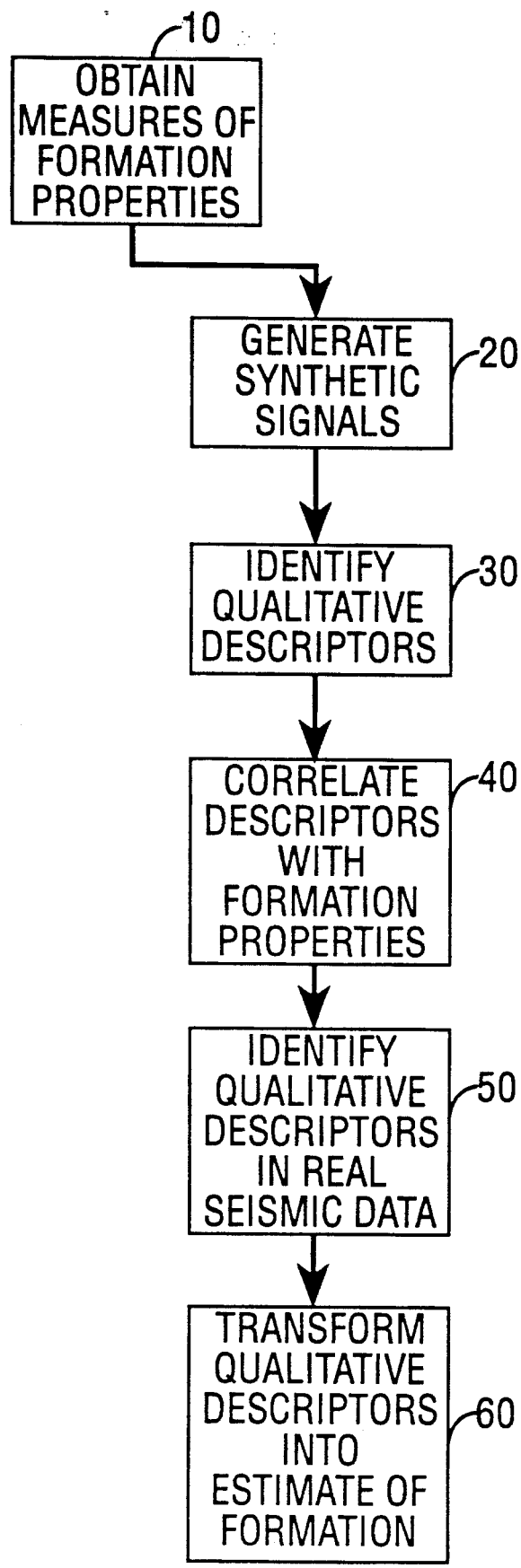
FIG. 1 is a flow diagram of the present inventions.

Looking now to FIG. 1, the present invention will be described in more detail. In particular, FIG. 1 comprises a flow diagram, whereby at step 10 measures of formation properties are obtained for selected geographic locations within a given basin. Such formation properties can be intrinsic as well as extrinsic measures of the formation including: porosity, porosity-thickness, impedance, density, velocity, electrical resistivity, formation thickness, permeability, etc. Typically, measures of such formation properties can be obtained from well logs, core samples, and the like. As will be described later, such measures of formation properties can also be obtained from assumed geological models of the earth's subsurface formations. Thereafter, sets of synthetic seismic signals can be produced using the formation properties employing methods well-known to explorationists at step 20. By way of example, a wavelet having the known characteristics of a seismic source can be convolved with a function representative of formation impedance to produce a set of synthetic seismic signals as depicted in FIG. 2.

Figure 2:
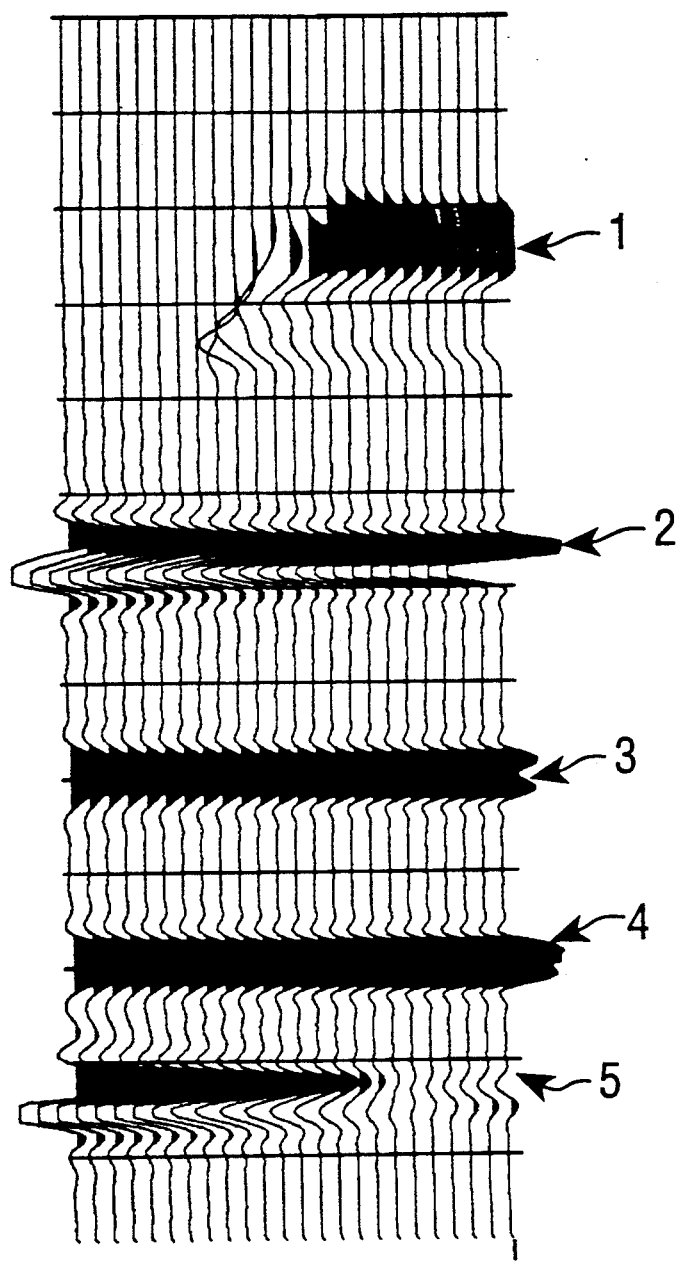
FIG. 2 comprises a synthetic set of seismic signals depicting various seismic events having qualitatively distinguishable features.

Looking at FIG. 2, a skilled explorationist could readily distinguish the seismic reflection events therein, albeit qualitatively. For example, seismic events 1 and 2 can be compared and contrasted based on their relative amplitudes and frequencies. Specifically, seismic event 1 has lower amplitude and lower frequency content than seismic event 2; whereas, seismic event 2 has higher amplitude and higher frequency content. Similarly, a "doublet" represented by seismic events 3 and 4 has different relative amplitudes. Seismic event 5 represents an amplitude versus offset (AVO) effect. By way of further example, such relative differences in the waveform of the seismic event can also include increasing or decreasing amplitude as a function of offset, polarity reversals, etc., all of which will hereinafter simply be referred to as qualitative descriptors of the waveform of the seismic event. Those and other relative differences in the waveform of seismic events can readily be identified by those skilled in the art at step 30.

Figure 3:
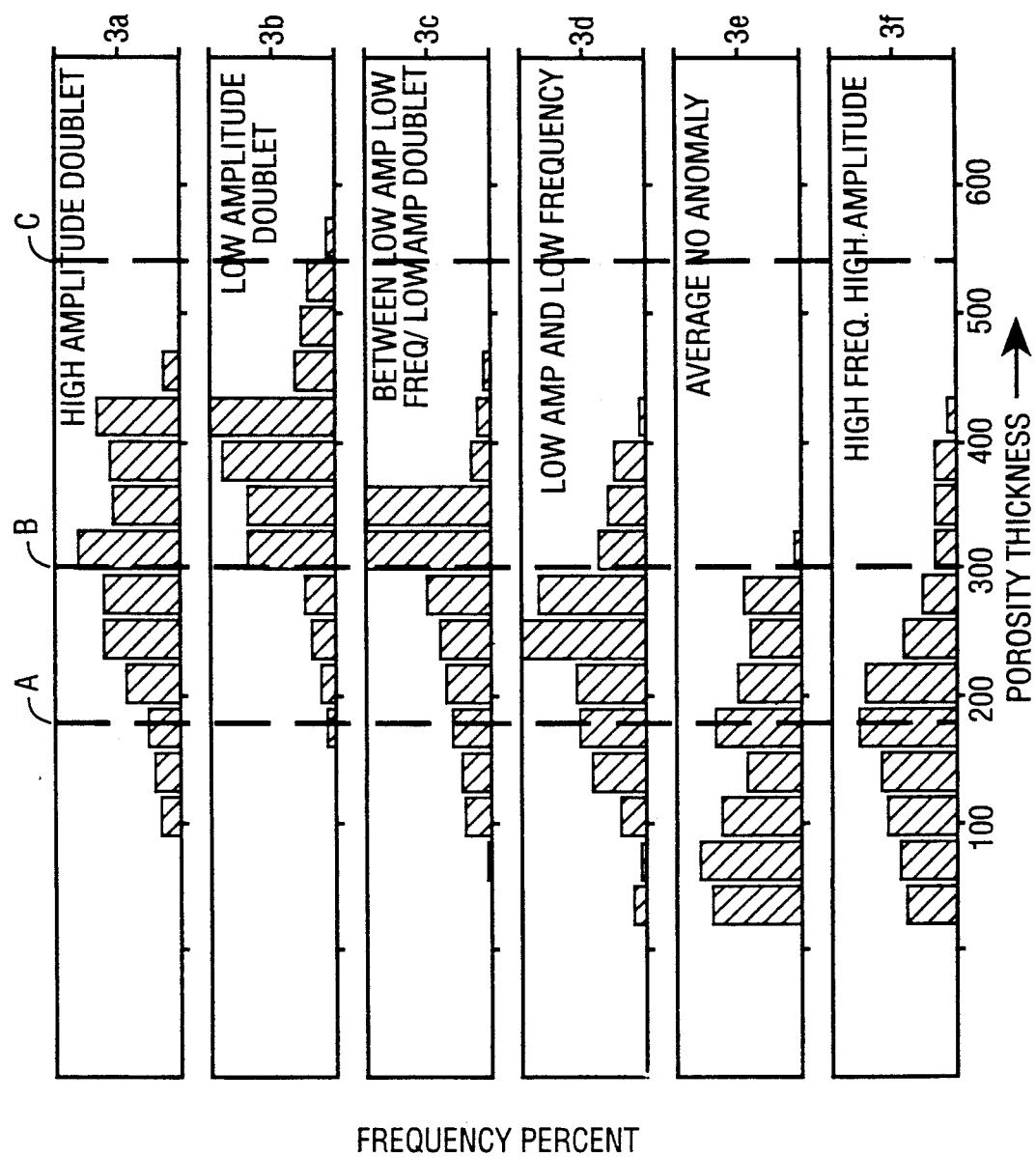
FIGS. 3a, b, c, d, e and f comprises a set of histograms relating the frequency of occurrence of qualitative descriptors of seismic events with a selected formation property.

The various qualitative descriptors identified in the synthetic signals in step 30 can be correlated with the known formation properties at step 40 to form a histogram. Alternatively, qualitative descriptors can be obtained for seismic events in real seismic data for which the explorationist has measures of formation properties. FIGS. 3a, b, c, d, e, and f comprise a set of histograms depicting the correlation, or frequency of occurrence, of selected qualitative descriptors obtained from the synthetic seismic signals for a given range of known formation properties. In fact, FIG. 3 represents a correlation, or frequency of occurrence, of selected qualitative descriptors obtained from approximately 1,000 synthetic seismic signals with measures of formation porosity-thickness obtained from approximately 10 wells geographically distributed in the same general basin. As used herein, the formation property of porosity-thickness represents a product of formation porosity and thickness (e.g. a porosity-thickness of 400 can represent a bed 20 feet thick having a porosity of 20%; alternatively it can represent a 40 foot thick bed having a porosity of 10%).

The following qualitative descriptors versus porosity-thickness are shown in FIG. 3: high amplitude doublets in FIG. 3a, low amplitude doublets in FIG. 3b, between low amplitude, low frequency and low amplitude doublets in FIG. 3c, low amplitude and low frequency in FIG. 3d, an "average" seismic event in FIG. 3e and high frequency, high amplitude in FIG. 3f. Superimposed on FIGS. 3a, b, c, d, e, and f are three vertical lines A, B, and C. Line A corresponds to a porosity-thickness of approximately 180; line B corresponds to a porosity-thickness of 300; and line C corresponds to a porosity-thickness of 540. The significance of lines A, B and C will be discussed below.

At step 50, a set of seismic data is obtained in a region generally included within the same basin in which the correlation of qualitative descriptors with formation properties was derived. In particular, the explorationist identifies selected seismic events which represent subsurface formations of interest and thereafter "grades" or evaluates the waveform of the seismic events so as to identify one or more qualitative descriptors. Having done so, at step 60, the explorationist can then transform the qualitative descriptor found in the real seismic data into a quantitative estimate of a formation property or into a relative measure a formations potential to be economically productive. It will also be understood that the explorationist can also employ the histogram as a guide to looking for seismic events exhibiting one or more qualitative descriptors associated with a particular range of formation properties.

In particular, one or more histograms similar to those in FIG. 3 can be employed by the explorationist as a rapid means for transforming qualitative descriptors of a seismic event in real seismic data into a most likely estimate of formation properties. Moreover, it can be seen that certain of the qualitative descriptors have a good correlation with high porosity-thickness. High porosity-thickness, as generally indicated by line C in FIG. 3, can be an extremely positive indication of economically productive formations. Conversely, certain qualitative descriptors are biased toward lower porosity-thickness, as generally indicated by line A in FIG. 3, which can be a good indication of a poor or non-economically productive formation. In fact, the qualitative descriptors depicted in FIGS. 3a, 3b, and 3c, in an after-the-fact evaluation of several sets of real seismic data, would have predicted economically productive wells 60% of the time, whereas the qualitative descriptors depicted in FIGS. 3e and 3f would have predicted non-productive, or dry wells 92% of the time. In view of the ever increasing costs to drill wells, the ability to distinguish economically productive wells is an extremely important result of this technique.

Figure 4:
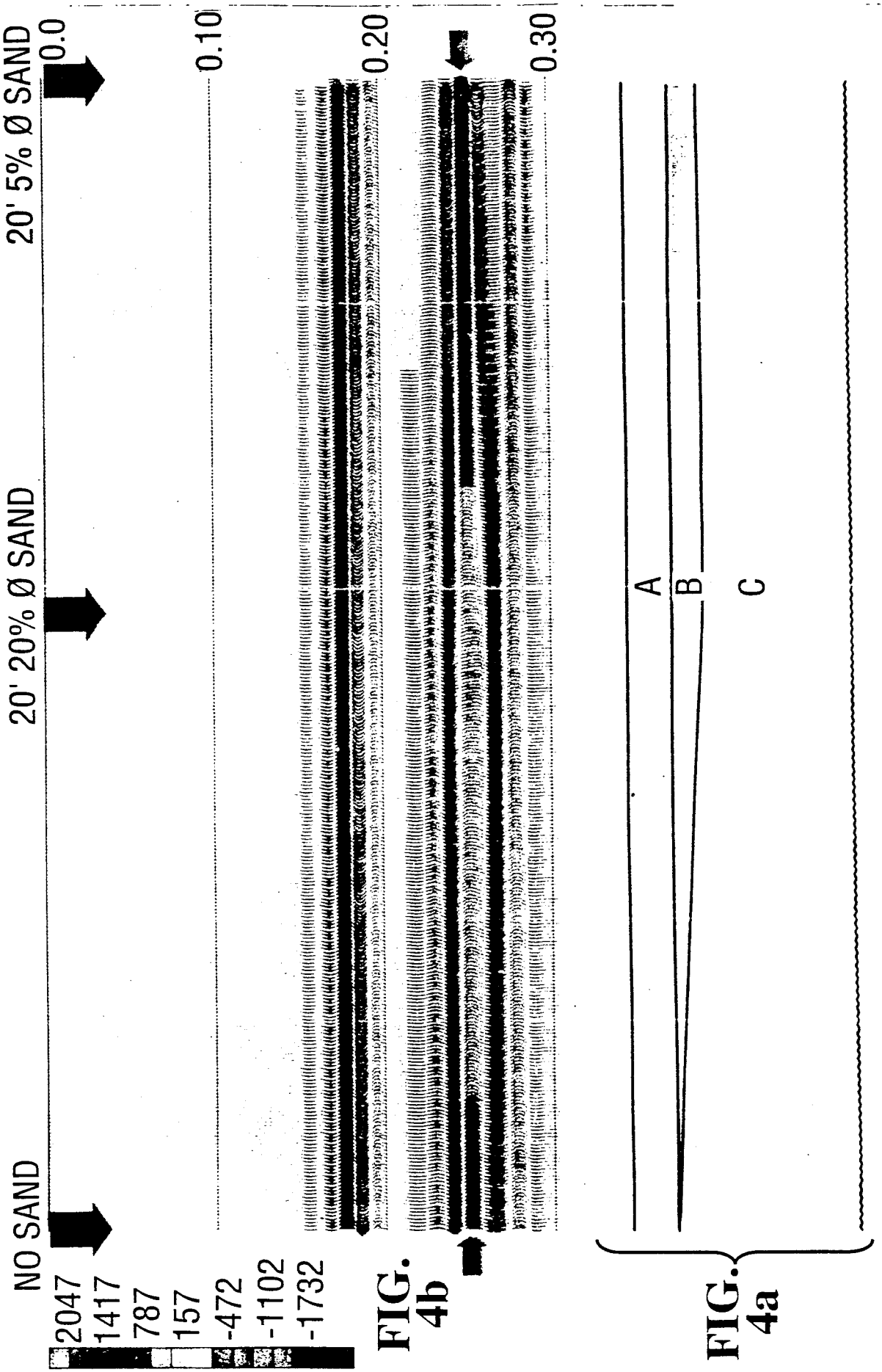

Looking now to FIG. 4a, a model of a subsurface formation having varying bed thickness and porosity is depicted. In particular, bed thickness increases linearly from 0 ft to 20 ft and thereafter remains fixed, while porosity decreases linearly from 20% to 5%, but only over the interval of fixed bed thickness. In FIG. 4b a set of synthetic signals are derived for the model formation depicted in FIG. 4a. By color coding the amplitude of the seismic events, one can clearly see that as the bed thickness increases, with a constant porosity of 20%, one observes a decrease in amplitude and a decrease in frequency content for the seismic event of the formation of interest, indicated by the pair of opposing arrows. However, with bed thickness remaining constant and porosity now decreasing, once again one can see a tendency towards increasing frequency content and increasing amplitude in the seismic event for the formation of interest. Using qualitative descriptors in conjunction with histograms, such as FIG. 3, one can clearly see that a low amplitude, low frequency qualitative descriptor would clearly distinguish economically productive formations and that a high frequency, high amplitude qualitative descriptor would clearly distinguish formations which are not economically productive. Moreover, such qualitative descriptors can now provide an estimate of formation porosity-thickness.

Figure 5:
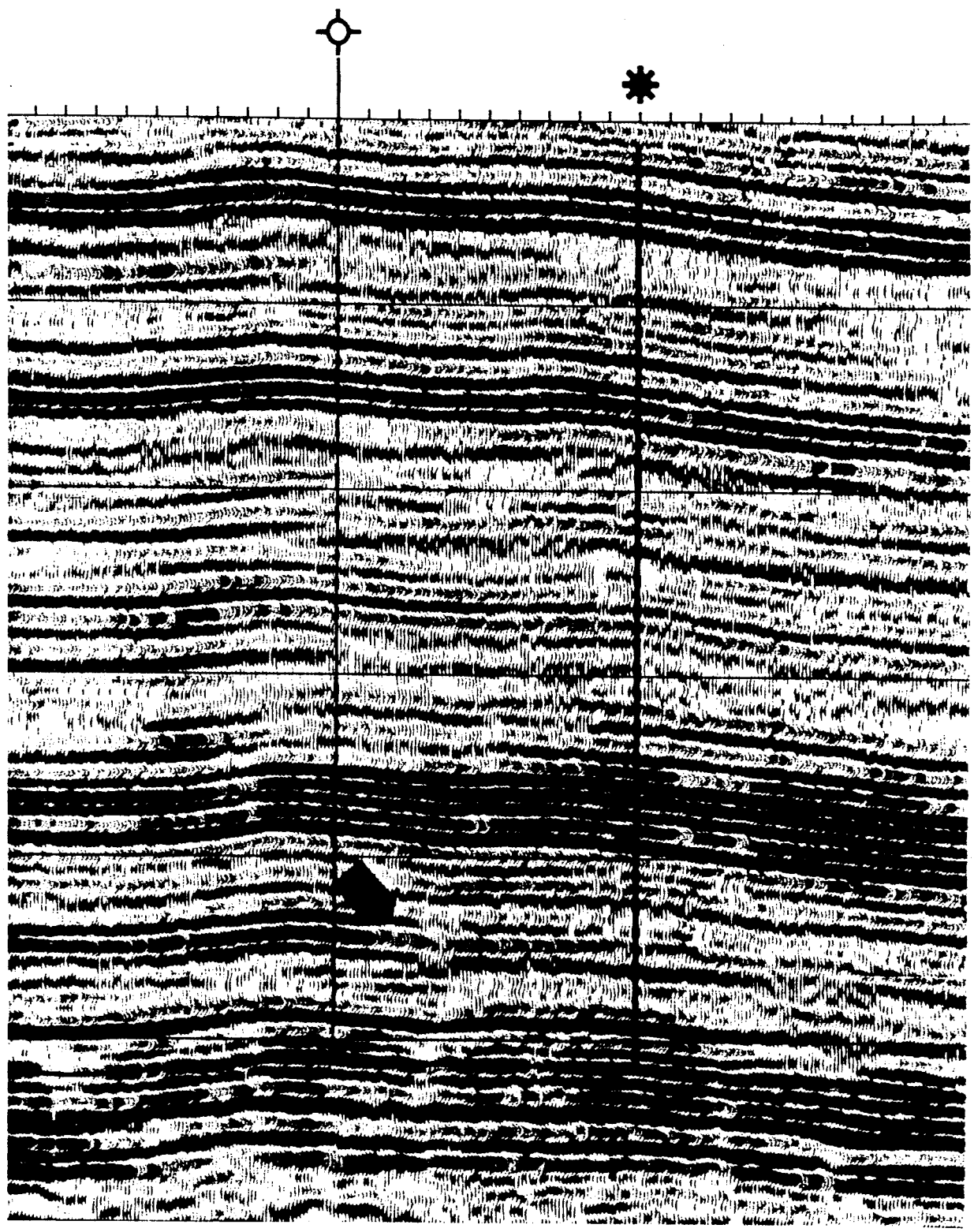
FIG. 5 comprises a set of actual seismic data.

Looking now to FIG. 5, a set of real seismic data are shown in which a formation of interest is represented by a series of seismic events highlighted with an arrow. As in FIG. 4, the color coding of the seismic data indicates relative changes in seismic event amplitude, yellow being a low and red high. A skilled explorationist would evaluate the seismic events as having relatively low amplitude and low frequency compared to the seismic events on either side thereof for the formation of interest. In this example, two wells were drilled in this area. The first, which is indicated on the left side, was nonproductive, whereas the second, on the right side, was a productive well. Use of qualitative descriptors of the seismic events in the seismic data in conjunction with the histogram of FIG. 3 would have also predicted this result.

The foregoing merely describes one embodiment of the present invention. It is understood that various modifications and enhancement to the present invention may become apparent to those skilled in the art without departing from the scope of the invention. In particular, other sets of qualitative descriptors can be correlated with other sets of formation properties to yield a variety of different histograms some of which may clearly identify economically productive formations while others may clearly identify non-economically productive formations. Nevertheless, the present invention is to be limited only by the scope of the Claims below.

I claim:

1. A method of geophysical exploration, comprising the steps of:
   (a) obtaining measures of at least one formation property at a plurality of locations in a basin;
   (b) generating a set of synthetic seismic signals employing the measures of at least one formation property for the basin;
   (c) identifying at least one attribute quantitatively descriptive of the waveforms of seismic events in the set of synthetic seismic signals and obtaining therefrom qualitative descriptors descriptive of relative differences in the quantitative attributes for a seismic event in the set of synthetic seismic signals by comparing and contrasting the quantitative attributes for the seismic event;
   (d) producing a histogram correlating the frequency of occurrence of at least one of the qualitative descriptors as a function of a range of the formation property;
   (e) identifying at least one attribute quantitatively descriptive of the waveforms of seismic events in a set of seismic data obtained in the basin and obtaining therefrom qualitative descriptors descriptive of relative differences in the quantitative attributes for a seismic event in the set of seismic data by comparing and contrasting the quantitative attributes for the seismic event; and
   (f) obtaining an estimate of the formation property by correlating the qualitative descriptor for the seismic event in the seismic data with a range of the formation property depicted in the histogram.

2. The method of claim 1, further including the step of obtaining an estimate of the formation property by correlating at least two qualitative descriptors with a range of the formation property depicted in the histogram.

3. The methods of claim 1, further including the step of obtaining estimates of the economic potential for producing hydrocarbons within the basin by correlating at least two qualitative descriptors with a range of the formation property depicted in the histogram.

4. The method of claim 1, wherein the qualitative descriptors include: relative amplitude, relative frequency, relative phase, relative amplitude versus offset, relative polarity and relative waveform type.

5. The method of claim 1, wherein the formation property includes: porosity, porosity-thickness, density, electric resistivity, velocity, formation thickness and permeability.

6. The method of claim 1, further including the step of:
   (a) obtaining estimates of economic potential for producing hydrocarbons of a given formation represented by the seismic events in the seismic data by correlating the qualitative descriptors of seismic events in the set of seismic data with the histogram.

7. The method of claim 1, wherein the measures of the formation property are obtained from the group including: core samples, well log measurements and assumed properties of a geological model of the basin.

8. A method of claim 1, further comprising the steps of:
   (a) obtaining at least two qualitative descriptors descriptive of relative differences in the waveform of seismic events in a first set of seismic data by comparing and contrasting the waveform of the seismic events;
   (b) producing at least two histograms correlating each of the qualitative descriptors with a range of a formation property;
   (c) obtaining at least two qualitative descriptors descriptive of relative differences in the waveform of seismic events in a second set of seismic data by comparing and contrasting the waveform of the seismic events, wherein said at least two qualitative descriptors are qualitatively descriptive of the same relative differences in the waveform of seismic events as the qualitative descriptors for the first set of seismic data; and
   (d) obtaining an estimate of the formation property by correlating the at least two qualitative descriptors of seismic events in the second set of seismic data with a range of the formation property depicted in their corresponding histograms.

9. The method of claim 8, further including the step of:
   (a) obtaining an estimate of economic potential for producing hydrocarbons by formations represented by the seismic events in the second set of seismic data by correlating the at least two qualitative descriptors of the seismic events in the second set of seismic data with the histogram.

10. The method of claim 8, wherein the first set of seismic data comprise synthetic seismic signals.

11. The method of claim 8, wherein the first set of seismic data comprise real seismic signals.

12. The method of claim 8, wherein the formation property is selected from the group including: porosity, porosity-thickness, electrical resistivity, density, velocity and permeability.

* * * * *